(12) United States Patent
Bach et al.

(10) Patent No.: US 11,667,421 B2
(45) Date of Patent: Jun. 6, 2023

(54) SEALING BODY

(71) Applicant: WATTTRON GMBH, Freital (DE)

(72) Inventors: Sascha Bach, Dresden (DE); Marcus Stein, Dresden (DE)

(73) Assignee: WATTTRON GMBH, Freital (DE)

( * ) Notice: Subject to any disclaimer, the term of this patent is extended or adjusted under 35 U.S.C. 154(b) by 475 days.

(21) Appl. No.: 16/334,621

(22) PCT Filed: Sep. 21, 2017

(86) PCT No.: PCT/EP2017/073903
§ 371 (c)(1),
(2) Date: Mar. 19, 2019

(87) PCT Pub. No.: WO2018/055034
PCT Pub. Date: Mar. 29, 2018

(65) Prior Publication Data
US 2021/0276755 A1  Sep. 9, 2021

(30) Foreign Application Priority Data

Sep. 21, 2016  (DE) .......................... 102016117834.9

(51) Int. Cl.
*B65B 51/22* (2006.01)
*B29C 65/18* (2006.01)
(Continued)

(52) U.S. Cl.
CPC ............ *B65B 51/227* (2013.01); *B29C 65/18* (2013.01); *B29C 65/224* (2013.01);
(Continued)

(58) Field of Classification Search
None
See application file for complete search history.

(56) References Cited

U.S. PATENT DOCUMENTS

| 3,367,261 A | 2/1968 | Kashiwagi |
| 4,292,118 A | 9/1981 | Wyslotsky |

(Continued)

FOREIGN PATENT DOCUMENTS

| CA | 948977 A1 | 6/1974 |
| CN | 1118584 A | 3/1996 |

(Continued)

OTHER PUBLICATIONS

Machine English Translation of EP1707340, Accessed Aug. 10, 2021 (Year: 2006).*

(Continued)

*Primary Examiner* — Jacob T Minskey
*Assistant Examiner* — Adrianna N Konves
(74) *Attorney, Agent, or Firm* — Heslin Rothenberg Farley & Mesiti P.C.; Kevin P. Radigan, Esq.

(57) ABSTRACT

The invention relates to a sealing body, where heat-producing elements of a heating element are contacted from the rear side thereof. Other aspects relate to a sealing body where the site of the heat production and the site of the heat dissipation (i.e. the point of action) are as close to each other as possible. Other aspects relate to a sealing body comprising a heat element with a built-in temperature sensor. Other aspects relate to a sealing body with a defined sealing contour. Other aspects relate to a sealing body having a three-dimensionally structured contact surface. Other aspects relate to a sealing body with a circular, annular, or strip-type heat element. Other aspects relate to a sealing body with built-in electronic circuits. Other aspects relate to a sealing body that can cool the heating element as required. Other aspects relate to a sealing body that can suck up the material to be welded.

20 Claims, 5 Drawing Sheets

(51) Int. Cl.
*B29C 65/22* (2006.01)
*B29C 65/30* (2006.01)
*B29C 65/36* (2006.01)
*B29C 65/78* (2006.01)
*B29C 65/00* (2006.01)
B29L 31/00 (2006.01)
B65B 51/10 (2006.01)

(52) U.S. Cl.
CPC .......... *B29C 65/225* (2013.01); *B29C 65/228* (2013.01); *B29C 65/30* (2013.01); *B29C 65/368* (2013.01); *B29C 65/3656* (2013.01); *B29C 65/3668* (2013.01); *B29C 65/7847* (2013.01); *B29C 66/221* (2013.01); *B29C 66/232* (2013.01); *B29C 66/3472* (2013.01); *B29C 66/3494* (2013.01); *B29C 66/43121* (2013.01); *B29C 66/53461* (2013.01); *B29C 66/72321* (2013.01); *B29C 66/73921* (2013.01); *B29C 66/8122* (2013.01); *B29C 66/81811* (2013.01); *B29C 66/81831* (2013.01); *B29C 66/81871* (2013.01); *B29C 66/83221* (2013.01); *B29C 66/91213* (2013.01); *B29C 66/91231* (2013.01); *B29C 66/91421* (2013.01); *B29C 66/91423* (2013.01); *B29L 2031/7128* (2013.01); *B65B 2051/105* (2013.01)

(56) References Cited

U.S. PATENT DOCUMENTS

| | | | |
|---|---|---|---|
| 5,682,732 | A | 11/1997 | Selberg |
| 5,715,656 | A | 2/1998 | Pearce |
| 10,464,236 | B2 | 11/2019 | Claus et al. |
| 2006/0096251 | A1* | 5/2006 | Donges .................. B29C 51/46 53/559 |
| 2008/0210683 | A1 | 9/2008 | Snell et al. |
| 2008/0314888 | A1 | 12/2008 | Chang |
| 2011/0101556 | A1 | 5/2011 | Bach et al. |
| 2012/0060447 | A1 | 3/2012 | Liu et al. |
| 2016/0334814 | A1* | 11/2016 | Dinkel .................. F24C 7/067 |

FOREIGN PATENT DOCUMENTS

| | | | | |
|---|---|---|---|---|
| CN | 1735535 | A | 2/2006 | |
| CN | 202053520 | U | 11/2011 | |
| CN | 104321184 | A | 1/2015 | |
| CN | 104321184 | A * | 1/2015 | ......... B29C 66/8511 |
| CN | 104924599 | A | 9/2015 | |
| CN | 105358305 | A | 2/2016 | |
| DE | 9409636 | U1 | 9/1994 | |
| DE | 4333852 | A1 | 3/1995 | |
| DE | 69416113 | T2 | 5/1999 | |
| DE | 202008003136 | U1 | 9/2008 | |
| DE | 102014202302 | A1 | 1/2015 | |
| EP | 1707340 | A1 * | 10/2006 | ....... B29C 66/91421 |
| EP | 2293909 | B1 | 4/2015 | |
| WO | WO 2008/034624 | A1 | 3/2008 | |
| WO | 2010116567 | A1 | 10/2010 | |
| WO | WO-2015074854 | A1 * | 5/2015 | ........... H05K 1/0209 |

OTHER PUBLICATIONS

Machine English Translation of CN 104321184, Accessed Aug. 10, 2021 (Year: 2015).*

Machine English Translation of WO2010116567, Accessed Aug. 10, 2021 (Year: 2012).*

Machine English translation of WO-2015074854-A1, Accessed Dec. 8, 2021 (Year: 2015).*

International Search Report issued in PCT/EP2017/073903 dated Nov. 1, 2018.

* cited by examiner

SEALING BODY

CROSS REFERENCE TO RELATED APPLICATIONS

This application is the National Phase filing under 35 U.S.C. § 371 of International Application No.: PCT/EP2017/073903, filed on Sep. 21, 2017, and published on Mar. 29, 2018 as WO 2018/055034 A1, which claims priority to German Application No.: 10 2016 117 834.9, filed on Sep. 21, 2016. The contents of each of the prior applications are hereby incorporated by reference herein in their entirety.

The invention relates to a sealing body for sealing, i.e. for bonding of plastics, primarily for the production of packaging made of thermoplastic materials, such as plastic films or film composites, such as plastic films coated with metallic and non-metallic materials, metal films coated with thermoplastic materials, such as aluminum foil and the like, for example in the production of tubular bags, the closing of containers, for example by sealing plastic foil with or without aluminum coating, plastic-coated aluminum foil or other thermally weldable materials onto plastic containers with or without coating or aluminum with plastic coating, or the sealing/welding of foils or foil laminates of the above type.

BACKGROUND ART

Permanently heated sealing tools are usually used for sealing. These usually consist of a heat cartridge (wound resistance conductor) and a basic body in which the heat cartridge and a temperature sensor required for temperature control are integrated. This mostly metallic base body (referred to as the sealing bar, sealing head or sealing tool) also usually has a contour that corresponds to the contour to be sealed. The contour can be configured as a narrow web or as a complex three-dimensional surface structure (e.g. corrugated profiling or truncated pyramids, etc.). As the site of the heat production (heat cartridge) and the point of action (sealing contour), as well as the site of the temperature measurement are usually separated by a few millimeters and the performance of the individual components (heat cartridge and temperature sensor) is decelerated (PT1 with a time constant of a few seconds in some cases), larger temperature fluctuations can occur during clocked continuous operation as a result of the thermal inertia of the overall system, which have a negative effect on the sealing quality. This occurs in particular during predominantly asynchronous operation and this variable load or system performance cannot be compensated or is insufficiently compensated by the temperature control. The large thermal mass of the entire structure (in particular the metallic base body) also requires a complex structure for thermal decoupling, resulting in larger assemblies. Furthermore, the heat of the metallic components in conjunction with the comparatively high coefficient of thermal expansion leads to a significant increase in length or circumference which leads to deviations in the plane parallelism of the tools or requires correspondingly large distances to components moved relative to them (for example, punching knives guided as closely as possible to save material).

There are heat cartridges with integrated temperature sensors, but these do not solve the described problem sufficiently, as the measurement is not made directly at the point of action or as close as possible to the point of action, but at some distance. In addition, the large thermal masses of the sealing bodies lead to sluggish control performance. There are also thick film heat elements based on metal. These enable temperature measurement and heat production close to the point of action by means of thin printed ceramic heat and sensor conductive traces but can only be produced as flat sealing tools. Further disadvantages of these well-known heaters are that the conductive traces at the front of the heater must be contacted and that neither the setting of a temperature profile nor a location-dependent variable control is possible.

SUMMARY OF THE INVENTION

Some aspects of this invention relate to a sealing body, where heat-producing elements of a heating element are contacted from the rear side thereof. Other aspects relate to a sealing body where the site of the heat production and the site of the heat dissipation (i.e. the point of action) are as close to each other as possible. Other aspects relate to a sealing body comprising a heating element with a built-in temperature sensor. Other aspects relate to a sealing body with a defined sealing contour. Other aspects relate to a sealing body having a three-dimensionally structured contact surface. Other aspects relate to a sealing body with a circular, annular, or strip-type heating element. Other aspects relate to a sealing body with built-in electronic circuits. Other aspects relate to a sealing body that can cool the heating element and/or the material to be welded as required. Other aspects relate to a sealing body that can suck up the material to be welded.

It has been shown that these proposed solutions contribute advantageously to each aspect of the invention, both individually and in any combination, to the improvement of known sealing bodies, and each combination of one or more of the features described below with those of known sealing bodies should therefore be considered to be covered by the inventive idea.

The invention is based on a sealing body for the thermal bonding of thermoplastic materials, which comprises a heating element which has a flat carrier substrate with a front side and a rear side, which consists of an electrically non-conductive ceramic material, and on the front side of which at least one heat conductor is arranged.

According to an embodiment, the proposed sealing body is designed such that at least one heat conductor is electrically contacted from the rear side of the carrier substrate through the carrier substrate.

A flat carrier substrate is understood to be a plate-shaped element, i.e. an element, the thickness dimension of which is small compared to the dimensions in the other two spatial directions, whereby it is irrelevant whether the carrier substrate as a whole is flat or curved or arched. However, one of the advantages of the proposed sealing body is precisely that the ceramic carrier substrate can not only be flat, but also curved or arched.

The carrier substrate may, for example, take the shape of a square or other polygon, a strip, i.e. a narrow rectangle, circular or elliptical disc, or a ring, which may also have the outer shape of a polygon, circle, etc. The carrier substrate may be in the form of a square or other polygon, a strip, i.e. a narrow rectangle, circular or elliptical disc, or a ring, which may also take the outer shape of a polygon, circle, etc. This makes it possible to provide a sealing body with a heating element that can be used for a wide variety of sealing applications and weld shapes.

The front side of the carrier substrate has one or more heat conductors arranged on it, which can be arranged in one plane (next to each other) or in several planes (above each other), for example, i.e. the front side of the heating element faces the material to be sealed.

For contacting the heat conductor(s) arranged on the front side of the carrier substrate from the rear side of the carrier substrate, the carrier substrate may, for example, have so-called VIAs (Vertical Interconnect Access), i.e. electrical conducting traces extending through the carrier substrate between a front side and a rear side of the carrier substrate in the thickness direction of the carrier substrate. For example, the carrier substrate may have small holes in the form of clearance holes whose boundary surfaces are coated with electrically conductive material or which are filled with electrically conductive material.

The electrically conductive material can, for example, be a printable electrically conductive paste, for example a ceramic mass mixed with electrically conductive particles (slurry). For the electrical contacting of a heat conductor, for example, the end of the VIAs located on the back of the carrier substrate can be directly contacted, for example by spring contacts, soldering, welding or screwing, etc.

According to an embodiment, the proposed sealing body is designed so that at least one sensor conductor for temperature measurement is arranged on the front side of the carrier substrate. Due to the resulting immediate proximity of a sensor conductor to a heat conductor, the sensor conductor is heated almost identically to the heat conductor. The temperature of the heating element can thus be easily determined from the temperature-dependent change in the electrical resistance of the sensor conductor. This temperature value can easily be used to control or regulate the heating element.

According to another embodiment, the proposed sealing body is designed such that at least one heat conductor simultaneously serves as a sensor conductor, as the electrical resistance of the heat conductor itself, which electrical resistance changes with the temperature, serves to determine the temperature of the heating element. The temperature value determined in this way can also be used here to control or regulate the heating element.

The use of the conductive traces, i.e. the heat conductor itself or a dedicated sensor conductor, has the further advantage that the resistance change due to temperature change takes place very quickly due to the low layer thickness of, for example, 5 to 20 μm and the resulting low thermal mass, thus enabling a fast reaction of the control system which enables very small control deviations.

The at least one heat conductor and, if available, the at least one sensor conductor can be advantageously produced by a thick-film printing technology which is inexpensive and also makes it possible to produce heat conductors and sensor conductors either in one work step or at least in work steps of one and the same process. The heat conductor(s) and, if available, the sensor conductor(s) can especially preferably consist of an electrically conductive ceramic material. For this purpose, an electrically conductive ceramic slurry in the form of conductive traces can be printed in a printing process onto an electrically non-conductive flat ceramic substrate, which at this time can be available as a blank compact, for example, but also as fired ceramic. At the same time, the through-plating of the heat conductor(s) and/or the sensor conductor(s) can take place by injecting the slurry into holes or bores in the carrier substrate when printing, so that VIAs are created which can serve as electrical contacts for the heat conductor(s) and/or the sensor conductor(s) from the rear of the carrier substrate. After a subsequent drying step, the ceramic substrate printed with ceramic conductor traces can then be fired as usual.

It may also be provided that the carrier substrate has at least one airflow aperture for expelling or drawing in air. For example, airflow apertures may be provided to direct cooling air from the back of the heating element to the front of the heating element to quickly cool the heating element and, if necessary, the welded material after a sealing operation has been performed. Airflow apertures may also be provided, for example, through which ambient air is passed from the front of the heating element to the rear of the heating element to draw in the material to be welded, such as a plastic film, to the heating element to increase thermal contact between the sealing body and the material to be welded, thereby improving the result of the welding process.

According to a further embodiment, it is intended that the front side of the heating element has three-dimensionally raised structures. This can, on the one hand, make it possible to intensify the heat effect of the sealing body on the material to be welded in order to create a close connection and, on the other hand, to create structured welding seams.

For this purpose, for example, at least one heat conductor and/or at least one sensor conductor may form a three-dimensionally raised structure. If these conductive traces are produced in a thick-film printing process in order to achieve a greater thickness of the conductive traces, possibly in several successive printing steps, the resulting conductive traces are noticeably raised from the surface of the carrier substrate and can therefore act directly as three-dimensionally raised structures in the above sense.

Alternatively or additionally, it can be provided that a flat contour element is arranged on the carrier substrate or/and on the at least one heat conductor or/and on the at least one sensor conductor, which forms a three-dimensionally raised structure. Such a contour element can, for example, either be formed in one piece with the carrier substrate or be produced by a thick-film printing process itself by printing a layer of well heat-conducting slurry either directly onto the carrier substrate or over the conductive traces. However, such a contour element can also, for example, be prefabricated, similar to the carrier substrate, and after printing and drying of the conductor traces, for example as a green compact or as already fired ceramic, either be glued onto the front side of the carrier element by means of a layer of slurry applied to the front side of the carrier substrate and the conductor traces arranged thereon, or be soldered onto the front side of the carrier substrate and the conductor traces arranged thereon, for example with a glass solder. With the latter variant, it is particularly easy to provide a contour element, which in turn has a three-dimensional structure on the front. The heating element comprising a contour element next to the substrate and the ceramic conductor(s) can then be fired as usual. In embodiments in which the contour element is also the element that comes into direct contact with the material to be welded, and where the heat conductor or conductors are located under or embedded in the contour element, the material of the contour element should be electrically non-conductive to avoid short circuits.

It may also be provided that the contour element has at least one airflow aperture for expelling or drawing in air. The position of such airflow apertures should be conveniently chosen so that they lie over corresponding airflow apertures in the support substrate when creating and/or attaching the contour element in order to allow the passage of air from the rear to the front or from the front to the rear of the heating element. As already described above, this enables the heating element and, if necessary, the welded material to be cooled quickly or the material to be welded to be drawn in.

Alternatively or additionally, it can be provided that the contour element has at least one superficial recess for the discharge of air. If the carrier substrate and the contour element are provided with airflow apertures one above the other, the recesses can be used, for example, to divert cooling air, which is discharged from the back of the heating element at the front of the heating element. For example, a ring-shaped heating element for sealing lidding film onto a packaging cup may have radial grooves on its front side through which cooling air is discharged. However, it is also possible to provide the carrier substrate with airflow apertures at points not covered by the contour element. The example above shows that the carrier substrate could be circular and the contour element ring-shaped. If the carrier substrate then has airflow apertures in a central region which is not covered by the contour element, the cooling air which thereby emerges at the front side of the heating element can be discharged to the outside through the grooves of the contour element which are fitted on the front side, the heated regions of the heating element, i.e. the conductor traces and the contour element itself being cooled by the cooling air which flows past.

The contour element preferably consists of an electrically non-conductive ceramic material with good thermal conductivity. This prevents a short circuit between the underlying conductor traces, but the heat generated by the heating conductor(s) is evenly distributed in the contour element.

Another advantage may be that the heating element is electrically contacted on its rear side by spring contacts. In this way, a heating element on a sealing element can be replaced more easily and quickly than would be the case with a permanent electrical contact, for example by soldered cables. Nevertheless, the inventive idea naturally also includes embodiments in which the electrical contacting of the heating element is realized in another way, for example by plug contacts, soldering or welding, for example wire bonding.

To attach the proposed heating element to a sealing body, it may also be provided that the heating element is attached with its back to a mounting body. The connection between heating element and mounting body can be advantageously detachable. Since the ceramic carrier substrate can be very thin, the heating element is given greater stability by such a mounting body, whereby the mounting body can simultaneously provide electrical contact with the heating element and enable the heating element to be attached to a sealing body, whereby the connection between the mounting body and the sealing body is also advantageously designed to be detachable.

In a further embodiment it can be provided that the mounting body is part of a housing which is designed for attachment to a packaging machine. In this case, in addition to the heating element and the mounting body to which the heating element is attached, the sealing body then includes a housing to which the mounting body is attached. The housing is designed for attachment to a packaging machine, so that the sealing body can at least be supplied with power from the packaging machine, possibly also with cooling air and/or vacuum.

If the sealing body has a housing as described above, this can be advantageously used to have control electronics and/or power electronics arranged inside the housing. This means that the sealing body can be used independently, i.e. the packaging machine itself neither has to control or regulate the sealing body nor provide the required voltage, because this is done by the sealing body itself. The packaging machine only has to provide the general power supply, for example with a supply voltage, compressed air or/and vacuum if necessary, and, if necessary, the definition of certain setpoints required for the sealing process, such as the setpoint temperature and the impact time of the sealing body on the material to be sealed. The housing can be embodied in the same way for different sealing bodies, so that packaging machines on which these sealing bodies are to be used only have to provide an interface that is always the same and is designed for attaching the housing of the sealing body.

In different embodiments of the proposed sealing body, it may be provided that at least two heat conductors are arranged at the same distance from the carrier substrate. This means that several heat conductors can be displayed on the same level, each of which heats only part of the heating element. This makes it possible to set a temperature profile via the surface, i.e. the front side of the heating element, by controlling different heat conductors differently.

Alternatively or additionally, it can be provided that at least two heat conductors are arranged at different distances from the carrier substrate. For example, a first heating circuit can initially be applied to the carrier substrate, for example printed, then a separating layer can be applied over the front side of the carrier substrate with the first heat conductor, for example printed, and finally a second heat conductor can be applied to the carrier substrate, for example printed. This facilitates, for example, a high heating output, whereby the first and second heat conductors can also cross each other without a short circuit occurring between them.

Similarly, it is possible that at least one heat conductor and one sensor conductor are arranged at the same distance from the carrier substrate, or/and that at least one heat conductor and one sensor conductor are arranged at different distances from the carrier substrate.

In a further embodiment, the proposed sealing body can be designed such that at least one heat conductor is coil-shaped and can be supplied with alternating voltage. In this way, an inductive alternating field is created which, in the case of metal-containing material to be welded, such as aluminum composite foil, leads to the material to be welded being individually or additionally heated.

Finally, it can be advantageously provided that at least two heat conductors can be controlled independently of each other. Depending on the arrangement of the two or more heat conductors in relation to each other, this can cause the heating element to generate an adjustable temperature field seen from its front side or to compensate for heat dissipation of varying intensity by setting a very uniform temperature profile over a larger area, to increase or decrease the heat output as required, etc.

The invention describes various embodiments of sealing bodies with heating elements, in which thin ceramic heat conductors are applied in thick-film technology to thin ceramic substrates (e.g. with a thickness of 1 mm or less). These heating tracks, which can be shaped to heating surfaces by means of targeted web guidance, only have a very low thermal mass and a very high-power density (up to over 50 W/cm$^2$), which permits very high heating dynamics. Furthermore, very dynamic temperature sensors can also be integrated, which enables very high control accuracy. The heaters can be embodied as plates, strips, discs or rings and can thus be adapted to the geometry of the surface to be sealed. In addition, one or more heating circuits can be arranged side by side or offset relative to each other in segments in order to generate a defined temperature distribution at the point of action with separate control in each case. The heat conductor traces can also be arranged in several levels or/and have a coil-like design, so that when an alternating voltage is applied, a magnetic field is created which improves the sealing process of aluminum-containing films.

Another special feature of the invention is the possible connection of the flat heating element (disc, ring or strip) around the point of action to the sealing surface/point of action through an additional thin (e.g. approx. 1 mm thick) ceramic or metallic component, namely a contour element with the sealing contour and high thermal conductivity, with suitable materials being, for example, aluminum nitride (AlN) or silicon carbide (SiSiC or SSiC). This enables direct heat input and the formation of the required (three-dimensional) seal contour. According to the invention, this contour element can be bonded to the surface of the thick-film heat element by gluing, soldering or sintering.

In addition, the heating element can be mounted on a thermally insulating base carrier (made of ceramic or high-temperature-resistant plastic) by gluing or a frictional connection (clamps, screws). This has a particularly positive effect with regard to the required thermal decoupling from the underlying mechanical connection of the sealing element. For this purpose, fasteners can be bonded to the heating element, which enable screwing or clamping with the base carrier and thus replacement in the event of a defect. The heating elements themselves are equipped with through-plating to the rear of the heater substrate, on which electrical contacting can be realized by means of spring contacts, soldering, welding, screwing or mechanical pressing.

Another advantageous embodiment is the direct integration of control elements into a self-sufficiently functioning sealing module. This only needs to be supplied with energy and the target parameters specified. This variant has a particularly positive effect in terms of compact design, easy integration into a machine and simplified maintenance by replacement.

The advantages of the proposed sealing body with regard to the technical characteristics are as follows:

- Low thermal mass and high heating dynamics in combination with a corresponding dynamic controller enable very high control accuracy with a control deviation of a few degrees Kelvin (also in case of fluctuating loads).
- Compact design of the heating element and integration of regulating and control elements in the sealing body itself enable compact assembly with good thermal characteristics.
- Low thermal expansion coefficients of the ceramic components used result in better dimensional accuracy over a wide temperature range.
- The thermal insulation enables the necessary control components (electronics) to be integrated directly into the sealing body, which is particularly advantageous when several separate heating circuits are used (e.g. in segments) and facilitates the electrical connection to the machine.
- By using several heating circuits arranged in segments next to each other or one above the other, temperature profiles or power levels can be displayed.
- When an alternating voltage is applied, a magnetic field is generated by a coil-like arrangement of conductor loops, also over several planes, which generates eddy currents in metallic components in the parts to be joined and thus leads to the main or additional internal heating of the parts to be joined, either alone or in relation to heat conduction from the heating element to the material to be welded.

BRIEF DESCRIPTION OF THE DRAWING FIGURES

The invention is explained in more detail below using exemplary embodiments and illustrations, showing.

DETAILED DESCRIPTION OF AN EMBODIMENT

Figure 1:
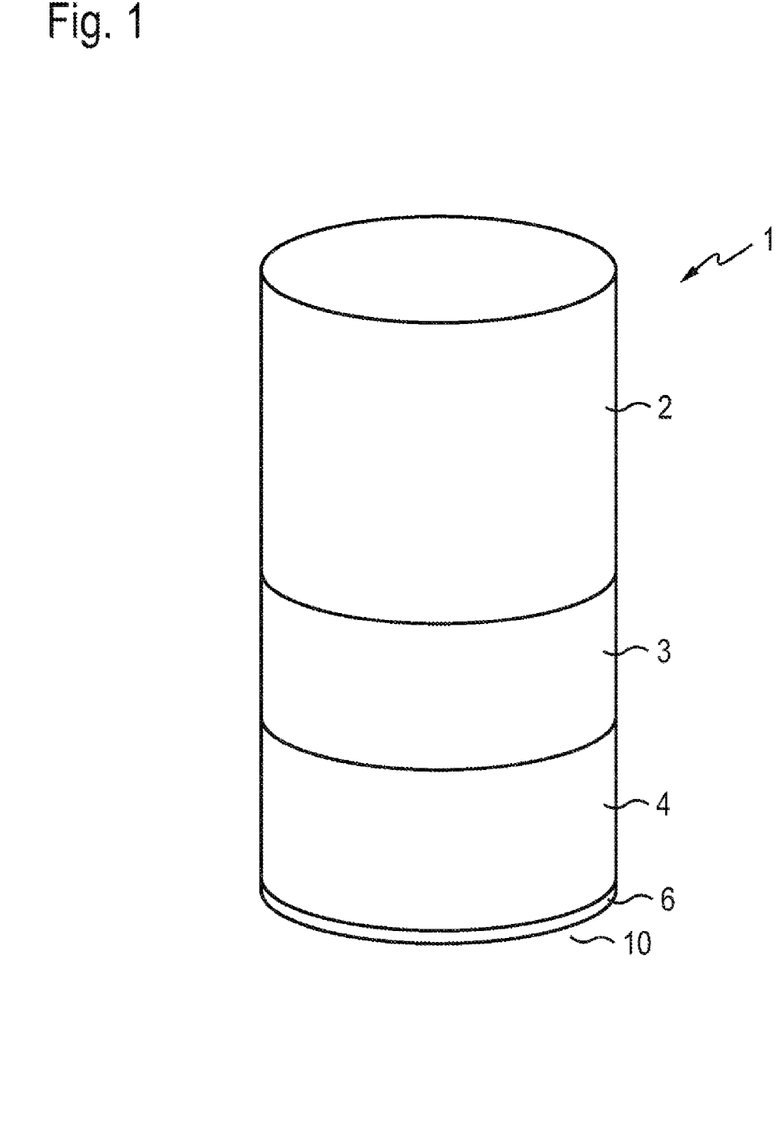
FIG. 1 an exemplary embodiment of a new sealing body with a heating element with a ring-shaped sealing contour, FIG. 2 the heating element of the sealing body from FIG. 1, FIG. 3 an exemplary configuration of the conductor traces of the heating element from FIG. 2, FIG. 4 an exemplary embodiment of a sealing body with a heating element with a strip-type sealing contour, FIG. 5 the heating element of the sealing body from FIG. 4, and FIGS. 6A and 6B exemplary configurations of the conductor traces of the heating element from FIG. 5.

FIG. 1 shows an overall view of a sealing body 1 with a ring-shaped sealing contour. An adapter 3 is attached to a housing 2 containing power and control electronics, which in turn carries an insulation body 4. A circular carrier substrate 6 of a heating element is arranged on the underside of the insulation body. As can be seen from FIG. 2, the carrier substrate 6 is attached to a mounting body 5, which in turn is held in the insulation body 4. The carrier substrate 6 has conductor traces 7 on its front side (in the drawing the underside of the carrier substrate), which can be embodied as heat conductors 7A or sensor conductors 7B, whereby several conductor traces 7 are arranged next to each other at the same distance from the carrier substrate 6 and the conductor traces 7 are arranged in two planes, i.e. at two different distances from the carrier substrate 6.

Figure 2:
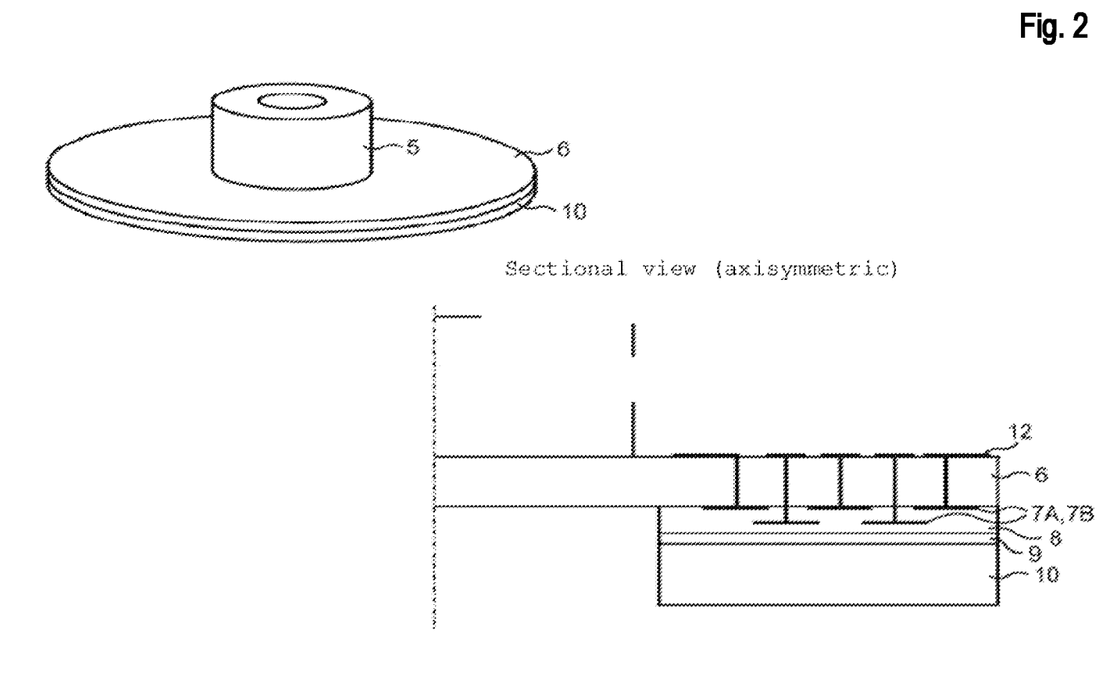

All conductor traces 7 are through-plated by VIAs 13 through carrier substrate 6, so that they can be electrically contacted from the back of the carrier substrate 6.

A covering layer 8 is arranged above the conductor traces 7, on which a ring-shaped contour element 10 is fastened by means of a connecting layer 9.

Figure 3:
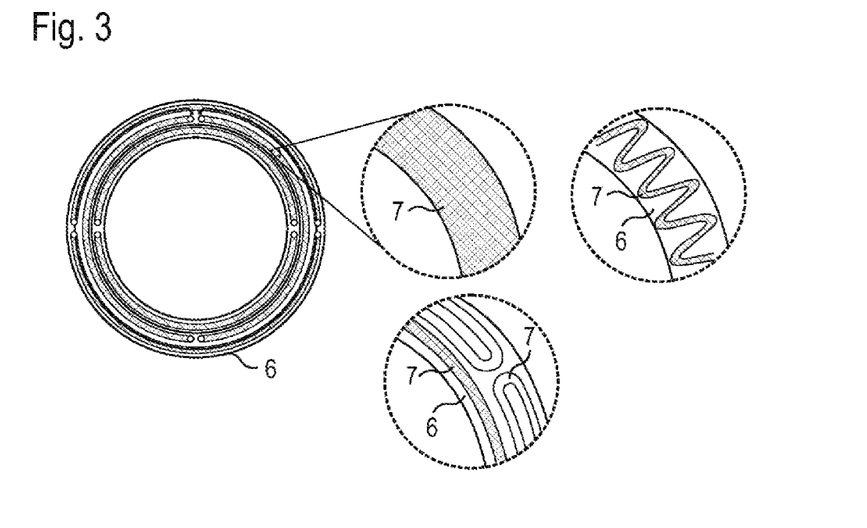

FIG. 3 shows an example of how the conductor traces 7 can be configured. It can be seen that conductor traces 7 can be arranged next to each other with the same distance to the carrier substrate 6 as well as on top of each other with different distances to the carrier substrate 6 and overlapping each other.

Figure 4:
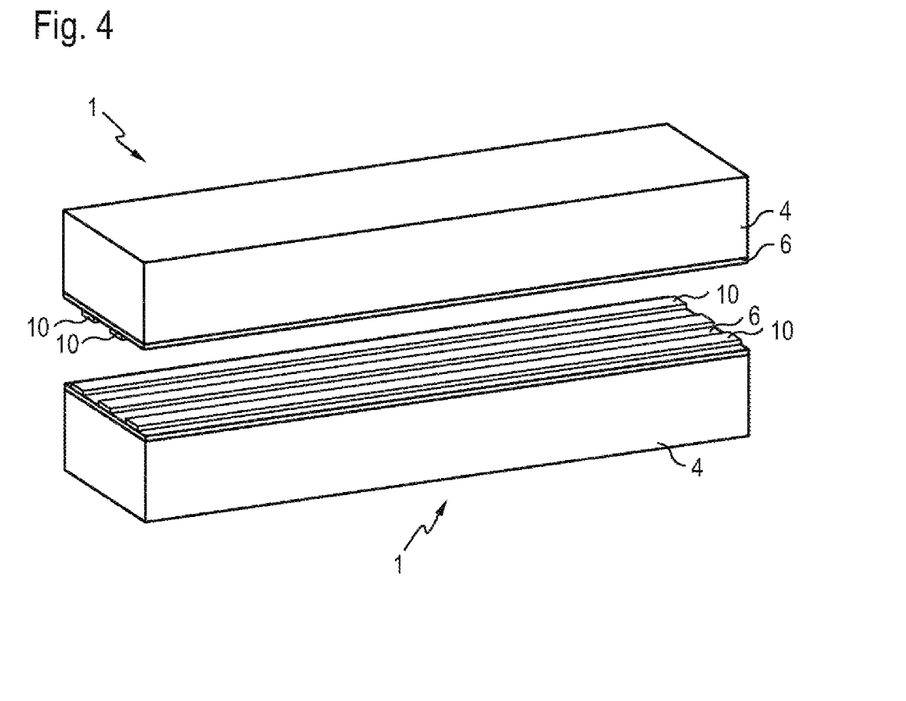

FIG. 4 shows an overall view of a pair of sealing bodies 1 with a strip-type sealing contour. Each insulation body 4 carries a heating element, which has a carrier substrate 6 with contour elements 10 arranged on it and conductor traces 7, and the front sides of the two heating elements face each other.

Figure 5:
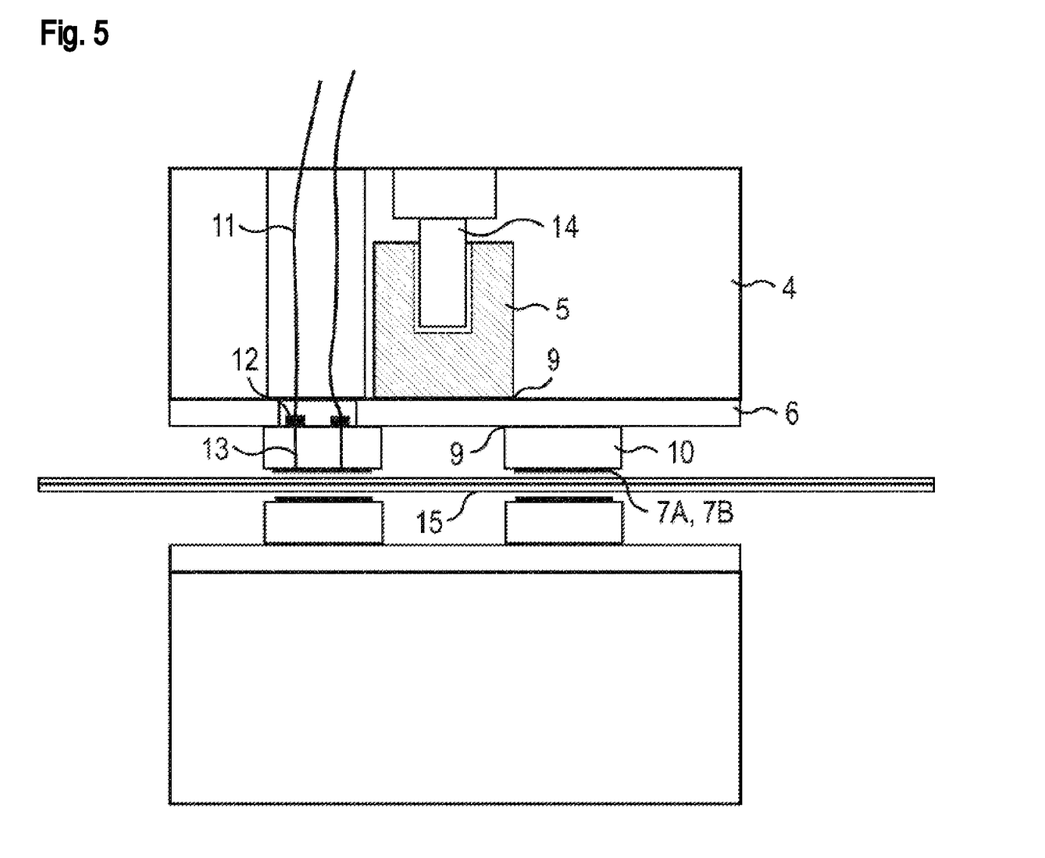

FIG. 5 shows that the rear of the carrier substrate 6 is bolted 14 to a fastener 5, which in turn is fastened in the insulation body 4.

In this embodiment, strip-type contour elements 10 are mounted directly onto the carrier substrate 6, and on each contour element 10, there is a conductor trace 7, which in this case is embodied as a heat conductor 7A. The heat conductors 7A are therefore through-plated with the use of VIAs 13, both through the respective contour element 10 and through the carrier substrate 6. The VIAs are connected at contact points 12 on the rear of the carrier substrate 6 by soldering with connection cables 11.

The two sealing bodies 1 face each other such that the material to be welded 15 can be passed between them, whereby the two sealing bodies 1 are moved towards each other for welding the material 15 until they enclose the material 15 to be welded between them.

Figure 6A:
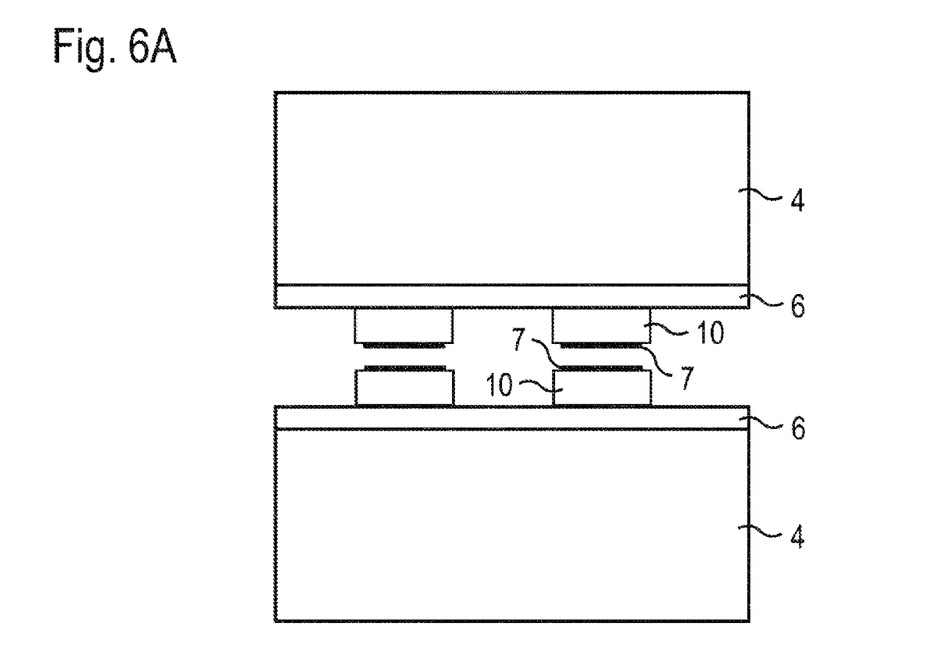
Figure 6B:
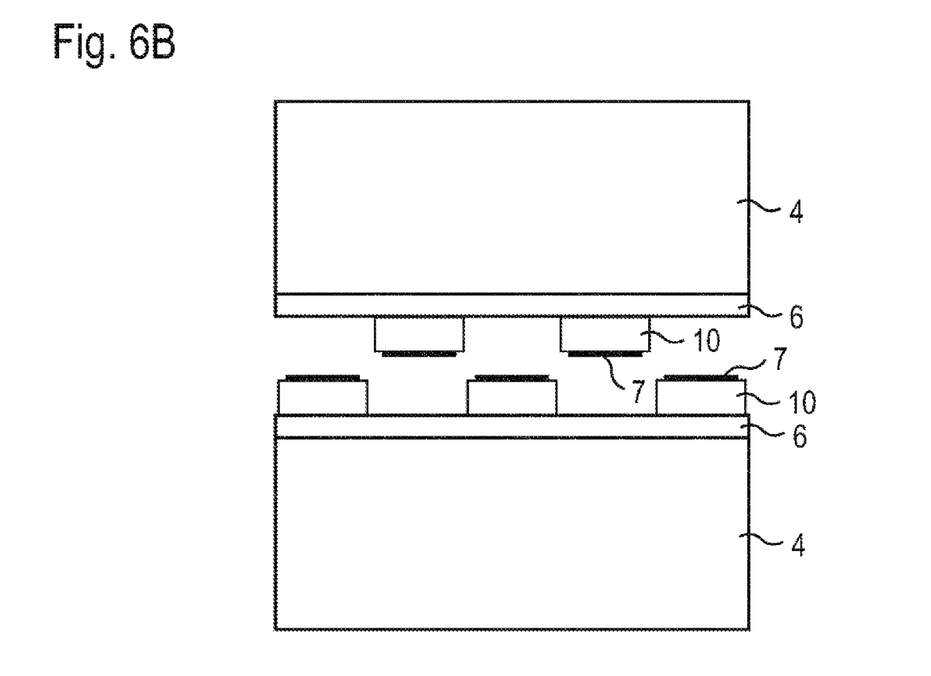

FIGS. 6A and 6B show two variants of a pairing of sealing bodies 1 in which the relative arrangement of the contour elements 10 and conductive traces 7 differs.

While the embodiment shown in FIG. 6A shows one conductor trace 7 for each of the two sealing bodies 1 arranged at the same position so that the opposite conductor traces 7 press against each other, the embodiment shown in FIG. 6B shows the conductor traces 7 arranged offset to each other so that the conductor traces 7 of one sealing body 1 press between two conductor traces 7 of the other sealing body.

REFERENCE LIST

1 Sealing Body
2 Housing
3 Adapter
4 Insulation body
5 Fastener
6 Carrier substrate
7 Conductor trace
  7A Heat conductor
  7B Sensor conductor
8 Covering layer
9 Connecting layer
10 Contour element
11 Connection cable
12 Contact point
13 VIA
14 Screw-connection
15 Material to be welded

The invention claimed is:

1. A sealing body for thermally bonding thermoplastic materials, comprising a heating element which has a carrier substrate with a front side and a rear side, which consists of an electrically non-conductive ceramic material, on the front side of which, at least two heat conductors are arranged, and are electrically contacted from the rear side of the carrier substrate through the carrier substrate by respective electrical vertical interconnect accesses (VIAs) through the carrier substrate, wherein the at least two heat conductors are thick-film conductors which are independently actuatable from one another, and the electrical VIAs are electrical contacts of the at least two heat conductors; and
wherein:
 the at least two heat conductors are operable to receive electric energy from a power supply conducted through the respective VIAs;
 the at least two heat conductors are operable to convert the electric energy to heat energy capable of thermally bonding plastic materials; and
 the electrical VIAs and the at least two heat conductors are formed of a same electrically conductive ceramic material.

2. The sealing body of claim 1, in which at least one sensor conductor for temperature measurement is arranged on the front side of the carrier substrate.

3. The sealing body of claim 2, in which the at least one sensor conductor is a thick-film conductor.

4. The sealing body of claim 3, in which the at least one sensor conductor consists of the electrically conductive ceramic material.

5. The sealing body of claim 1, in which the carrier substrate has at least one airflow aperture for expelling or drawing in air.

6. The sealing body of claim 2, in which the front face of the heating element has three-dimensionally raised structures.

7. The sealing body of claim 6, in which at least one of the at least two heat conductors or/and the at least one sensor conductor forms a three-dimensionally raised structure.

8. The sealing body of claim 6, in which a flat contour element, which forms a three-dimensionally raised structure, is arranged on the carrier substrate or/and on at least one of the at least two heat conductors or/and on the at least one sensor conductor.

9. The sealing body of claim 8, in which the contour element has at least one airflow aperture for expelling or drawing in air.

10. The sealing body of claim 8, in which the contour element has at least one surface recess for diverting air.

11. The sealing body of claim 8, in which the contour element consists of a ceramic material with good thermal conductivity.

12. The sealing body of claim 1, in which the heating element is electrically contacted on its rear side by spring contacts, plug contacts, soldering, welding or wire bonding.

13. The sealing body of claim 1, in which the heating element is attached with its rear side to a fastener.

14. The sealing body of claim 13, in which the fastener is part of a housing which is embodied for attachment to a packaging machine.

15. The sealing body of claim 14, in which control electronics and/or power electronics for the at least two heat conductors are arranged inside the housing, which is embodied for attachment to the packaging machine as a self-sufficient functioning sealing module.

16. The sealing body of claim 1, in which at least two heat conductors are arranged equidistantly from the carrier substrate.

17. The sealing body of claim 1, in which at least two heat conductors are arranged at a different distance from the carrier substrate.

18. The sealing body of claim 2, in which the at least two heat conductors and the at least one sensor conductor are arranged at the same distance from the carrier substrate.

19. The sealing body of claim 2, in which the at least two heat conductors and the at least one sensor conductor are arranged at a different distance from the carrier substrate.

20. The sealing body of claim 1, in which at least one of the at least two heat conductors is coil-shaped and can be supplied with an alternating voltage.

* * * * *